US012172269B2

(12) United States Patent
Gillespie et al.

(10) Patent No.: US 12,172,269 B2
(45) Date of Patent: Dec. 24, 2024

(54) FASTENER COLLAR RETAINER

(71) Applicant: THE BOEING COMPANY, Chicago, IL (US)

(72) Inventors: Hannah G. Gillespie, Seattle, WA (US); Daniel M. De Oliveira, Renton, WA (US); Andrei V. Arevalo, Marysville, WA (US); Charles M. Richards, Kent, WA (US); James E. Wilder, Maple Valley, WA (US); James J. Troy, Issaquah, WA (US)

(73) Assignee: The Boeing Company, Arlington, VA (US)

( * ) Notice: Subject to any disclaimer, the term of this patent is extended or adjusted under 35 U.S.C. 154(b) by 340 days.

(21) Appl. No.: 17/866,032

(22) Filed: Jul. 15, 2022

(65) Prior Publication Data

US 2023/0030042 A1 Feb. 2, 2023

Related U.S. Application Data

(60) Provisional application No. 63/227,826, filed on Jul. 30, 2021.

(51) Int. Cl.
*B25B 23/10* (2006.01)
*B25B 13/48* (2006.01)

(52) U.S. Cl.
CPC ............ *B25B 23/10* (2013.01); *B25B 13/481* (2013.01)

(58) Field of Classification Search
CPC ....... B25B 23/08; B25B 23/10; B25B 23/101; B25B 13/481
See application file for complete search history.

(56) References Cited

U.S. PATENT DOCUMENTS

| | | | | |
|---|---|---|---|---|
| 4,744,273 | A * | 5/1988 | Bartok, Jr. | B25B 23/10 81/125 |
| 7,069,826 | B2 * | 7/2006 | Tilton | B25B 23/101 81/452 |
| 8,069,754 | B2 * | 12/2011 | Elgin | B25B 13/06 81/125 |
| 8,893,591 | B2 * | 11/2014 | DePue | H02G 1/00 81/125 |
| 8,978,523 | B2 * | 3/2015 | Stanfield | B25B 23/045 81/125 |
| 10,906,162 | B2 * | 2/2021 | Chang | B25B 23/10 |
| 11,446,797 | B2 * | 9/2022 | Boss | B25B 23/0007 |
| 2014/0026719 | A1 * | 1/2014 | Stanfield | B25B 13/06 81/125 |

(Continued)

*Primary Examiner* — David B. Thomas
(74) *Attorney, Agent, or Firm* — Walters & Wasylyna LLC

(57) ABSTRACT

An apparatus for retaining a fastener is described. The apparatus includes a base, including a first aperture including a central axis; and a sidewall extending outward from the base and surrounding the central axis, where the sidewall is configured to hold on to a socket; an arm extending outward from the base, including a biasing mechanism connecting a first end of the arm to the base, where the biasing mechanism configured to relieve stress between the base and the arm when the arm is actuated; and a lip disposed at a second end of the arm, where the second end is at an opposite end of the arm than the first end, and where the lip is configured to retain the fastener or a wrenching element of the fastener; and a finger flange configured to actuate the arm, where the finger flange is attached to the arm.

20 Claims, 4 Drawing Sheets

(56) References Cited

U.S. PATENT DOCUMENTS

| | | | | |
|---|---|---|---|---|
| 2014/0311303 | A1* | 10/2014 | Lin | B25B 23/101 81/452 |
| 2015/0000104 | A1* | 1/2015 | DePue | H02G 1/00 29/525.01 |
| 2015/0183096 | A1* | 7/2015 | Wang | B25B 23/101 81/455 |
| 2016/0243685 | A1* | 8/2016 | Blake | B25B 13/065 |
| 2019/0368532 | A1* | 12/2019 | Pasic | F16B 39/28 |
| 2021/0197346 | A1* | 7/2021 | Boss | B25B 23/101 |

* cited by examiner

FASTENER COLLAR RETAINER

CROSS-REFERENCE TO RELATED APPLICATION(S)

The present disclosure claims benefit of and priority to U.S. Provisional Patent Application Ser. No. 63/227,826 filed Jul. 30, 2021. The aforementioned patent application is incorporated herein in its entirety.

INTRODUCTION

Field

Aspects of the present disclosure relate to a system, method, and apparatus for installing and retaining a fastener.

Background

Installing and retaining fasteners, such as breakaway fasteners and other types of nuts, are important parts of production and assembly processes. Conventional methods and apparatuses for installing and retaining fasteners are limited in their capability or may not be suitable for certain production processes, such as installing breakaway fasteners on an aircraft.

Breakaway fasteners are fasteners configured to have a portion break off, such as a wrenching element, when a predetermined torque is applied to the fastener. When a breakaway fastener is installed on, for example, an aircraft, the wrenching element of the fastener must be recovered to prevent foreign object debris (FOD) from being left in the aircraft. FOD is material or debris, such as the wrenching element of the fastener, that is alien to the aircraft and can damage the aircraft or may fall into a difficult-to-access area and would need to be recovered from that location in order to prevent potential future problems. Damage from FOD is a serious matter and may cost millions of dollars to repair, require unplanned maintenance, temporarily remove an otherwise operable aircraft from service, or result in loss of an aircraft. This same problem may happen across many domains, including when using fasteners on many types of vehicles.

Conventional methods for installing the breakaway fastener use a ratcheting socket wrench (referred to as a ratchet) and socket to tighten the fastener and do not provide a means for retaining the wrenching element of the fastener in the socket after the fastener is installed. If the wrenching element falls out of the socket, it must be recovered so it does not become FOD. Thus, installing breakaway fasteners, particularly in areas with limited space with little or no room to recover a wrenching element, may be challenging using conventional methods and apparatuses.

Accordingly, there is a need for an improved method and apparatus for installing and retaining a fastener. For example, there is a need to retain the fastener, or a wrenching element of the fastener, during and/or after installation.

SUMMARY

Certain embodiments provide an apparatus for retaining a fastener. The apparatus comprises a base, an arm extending outward from the base, and a finger flange configured to actuate the arm, wherein the finger flange is attached to the arm. The base comprises a first aperture comprising a central axis, and a sidewall extending outward from the base and surrounding the central axis, wherein the sidewall is configured to hold on to a socket. The arm comprises a biasing mechanism connecting a first end of the arm to the base, wherein the biasing mechanism is configured to relieve stress between the base and the arm when the arm is actuated, and a lip disposed at a second end of the arm, wherein the second end is at an opposite end of the arm than the first end, and wherein the lip is configured to retain the fastener or a wrenching element of the fastener.

In another embodiment, an apparatus for retaining a fastener comprises a base, a plurality of arms extending outward from the base, and a plurality of finger flanges, wherein each finger flange of the plurality of finger flanges is attached to each arm of the plurality of arms and configured to actuate each arm. The base comprises a first aperture comprising a central axis and a sidewall extending outward from the base and surrounding the central axis, wherein the sidewall is configured to hold on to a socket. Each arm of the plurality of arms comprises a biasing mechanism connecting a first end of each arm of the plurality of arms to the base, wherein the biasing mechanism is configured to relieve stress between the base and each arm of the plurality of arms when the arm is actuated, and a lip disposed at a second end of each arm of the plurality of arms, wherein the second end is at an opposite end of the arm than the first end, and wherein the lip is configured to retain the fastener or a wrenching element of the fastener.

In another embodiment, a method for retaining a fastener comprises attaching a fastener retainer tool to a socket, attaching the socket and the fastener retainer tool to a ratchet via the first aperture of the base of the fastener retainer tool, and pushing the lip of the fastener retainer tool over a wrenching element of the fastener and further pushing the wrenching element into the opening of the socket, wherein the wrenching element of the fastener is configured to break away from the fastener at a predetermined torque, applying the predetermined torque to the wrenching element of the fastener and breaking the wrenching element away from the fastener, retaining the wrenching element of the fastener inside the opening of the socket using the lip of the fastener retainer tool, and pulling on the finger flange to actuate the biasing mechanism, move the arm outward from the central axis, and release the wrenching element of the fastener. The fastener retainer tool comprises a base, an arm extending outward from the base, and a finger flange configured to actuate the arm, wherein the finger flange is attached to the arm. The base comprises a first aperture comprising a central axis and a sidewall extending outward from the base and surrounding the central axis, wherein the sidewall is configured to hold on to a socket. The arm comprises a biasing mechanism connecting a first end of the arm to the base, wherein the biasing mechanism is configured to relieve stress between the base and the arm when the arm is actuated, and a lip disposed at a second end of the arm, wherein the second end is at an opposite end of the arm than the first end, and wherein the lip is configured to retain the fastener or a wrenching element of the fastener. The socket comprises an opening configured to engage the fastener, and the socket is held between the base and the lip of the fastener retainer tool.

In another embodiment, a method of using an apparatus for retaining a fastener, comprising using an apparatus to retain a wrenching element of the fastener, wherein the apparatus comprises a base, an arm extending outward from the base, and a finger flange configured to actuate the arm, wherein the finger flange is attached to the arm. The base comprises a first aperture comprising a central axis, and a sidewall extending outward from the base and surrounding the central axis, wherein the sidewall is configured to hold on to a socket. The arm comprises a biasing mechanism connecting a first end of the arm to the base, wherein the biasing mechanism is configured to relieve stress between the base and the arm when the arm is actuated, and a lip disposed at a second end of the arm, wherein the second end is at an opposite end of the arm than the first end, and wherein the lip is configured to retain the fastener or a wrenching element of the fastener.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
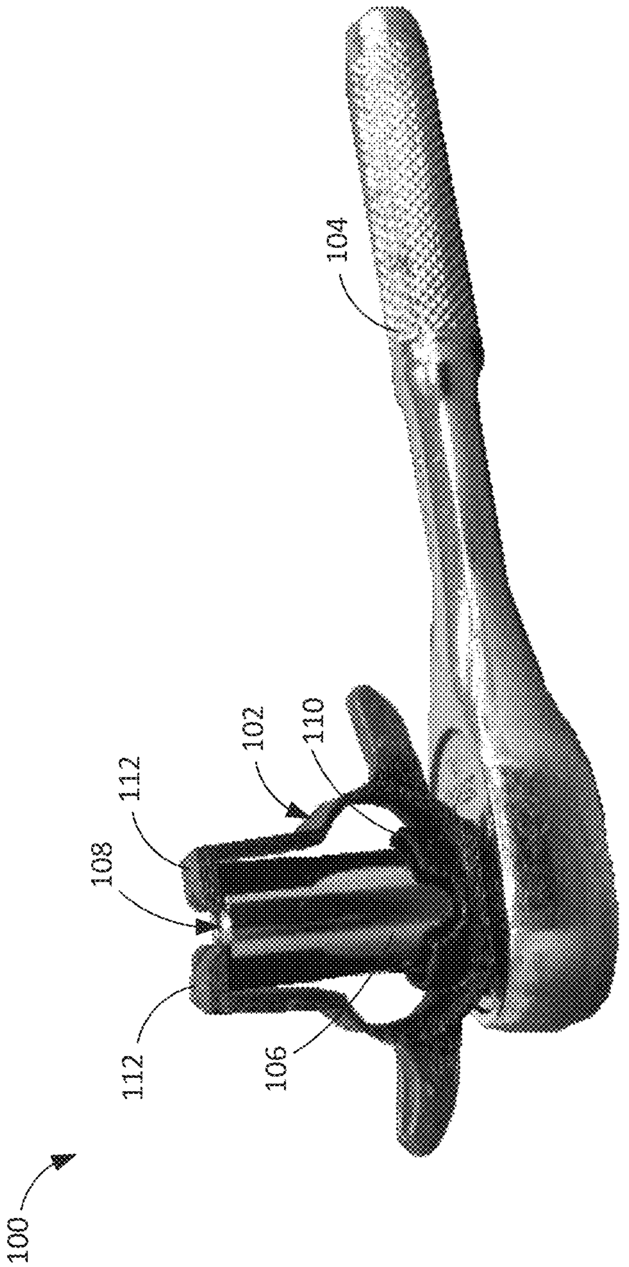
FIG. 1 depicts a perspective view of a system for retaining a fastener, according to an example of the present disclosure.

Aspects of the present disclosure provide a method and an apparatus for installing and retaining a fastener such that the fastener, or a portion of the fastener, is retained during and/or after installation.

According to one aspect, the apparatus for retaining a fastener connects to a ratchet and a socket. The ratchet and socket (referred to as a ratcheting socket set) are used to install a fastener on a surface. For example, the fastener may be a breakaway fastener and may be installed on an aircraft. The breakaway fastener may comprise a collar that threads onto a bolt to secure the fastener to the aircraft. As above, breakaway fasteners are fasteners with a portion that "breaks away" from the rest of the fastener when a predetermined torque is applied. The portion that breaks away may be referred to as a wrenching element. Generally, a wrenching element of the fastener, which may be referred to as a wrenching element of the collar, is engaged with a tool, such as a socket of a ratcheting socket set, in order to turn the fastener into place. The ratcheting socket set tightens the fastener until an applied torque reaches the predetermined torque and the wrenching element breaks off the fastener, leaving the main body of the fastener, which may be referred to as a collar, secured to the bolt with the predetermined amount of torque.

A shortcoming of conventional methods for installing fasteners is that they do not provide a means to capture the portion of the fastener that breaks off (e.g., the wrenching element). For example, the wrenching element of the breakaway fastener may fall out of the socket when the ratcheting socket set is used, creating a foreign object debris (FOD) hazard if the wrenching element is not recovered. When installed on an aircraft, every wrenching element that breaks away from the fastener must be recovered or the wrenching element becomes FOD that may damage the aircraft. Thus, the conventional method of using a ratcheting socket set may increase the risk of FOD when using breakaway fasteners. Other conventional systems use a vacuum or catch basin to capture the wrenching element. However, these systems cannot work in tight corners or areas with limited space because they are bulky and generally unwieldy.

The improved system, method, and apparatus for installing and retaining a fastener described herein addresses these issues by interfacing with the ratchet and the socket. The apparatus, referred to as a fastener retainer tool, uses one or more arms with a lip to retain the wrenching element inside the socket. When the wrenching element is safe to dispose such that it will not create a FOD hazard, one or more arms of the fastener retainer tool may be actuated to release the wrenching element. The fastener retainer tool also allows the ratcheting socket set to be used to install the fastener with minimal differences compared to just using the ratchet and socket, thus the fastener retainer tool may beneficially be used with existing tools.

Example System for Installing and Retaining a Fastener

FIG. 1 depicts an isometric view of a system 100 for retaining a fastener, such as a breakaway fastener, according to an example of the present disclosure. In particular, FIG. 1 shows an apparatus 102 (referred to as a fastener retainer tool 102) for retaining a fastener installed with a ratchet 104 and a socket 106. As shown, the tool 102 is secured in between the ratchet 104 and the socket 106.

In the depicted embodiment, the tool 102 comprises a sidewall 110 configured to hold on to the socket 106. For example, the sidewall 110 surrounds an exterior portion of the socket 106. The socket 106 comprises an opening 108 configured to engage the breakaway fastener. For example, the fastener may be a breakaway fastener and the socket 106 may have a hex-shaped (e.g., hexagonal) opening 108 configured to engage a hex-shaped wrenching element of a collar of the breakaway fastener. The lip 112 of the tool 102 is configured to be pushed over a wrenching element of the collar as the wrenching element is pushed into the opening 108 of the socket 106. The ratchet 104 is configured to rotate the socket 106, which is configured to apply a torque to the fastener as the fastener is threaded onto a screw thread of a bolt, a screw, a threaded rod, a pin, or a similar element. In particular, the torque is applied to the wrenching element of the collar of the fastener and the wrenching element of the collar is configured to break away from the fastener and the collar at a predetermined torque. The lip 112 is further configured to retain the wrenching element of the fastener inside the opening of the socket 106, which beneficially prevents the wrenching element from falling out of the socket 106 and becoming foreign object debris (FOD).

In some embodiments, the tool 102 rotates with the socket 106 as the torque is applied to the fastener. In other embodiments, the sidewall 110 of the tool 102 has a loose fit with the socket 106, allowing the tool 102 to spin freely around a central axis (not shown) of the socket 106, which beneficially enables the tool to be reoriented with respect to the socket 106 or ratchet 104 during operation.

In some embodiments, the lip 112 is configured to hold on to the socket 106 in the tool 102 such that the socket 106 does not fall out of the tool 102.

Example Apparatus for Retaining a Fastener

Figure 2:
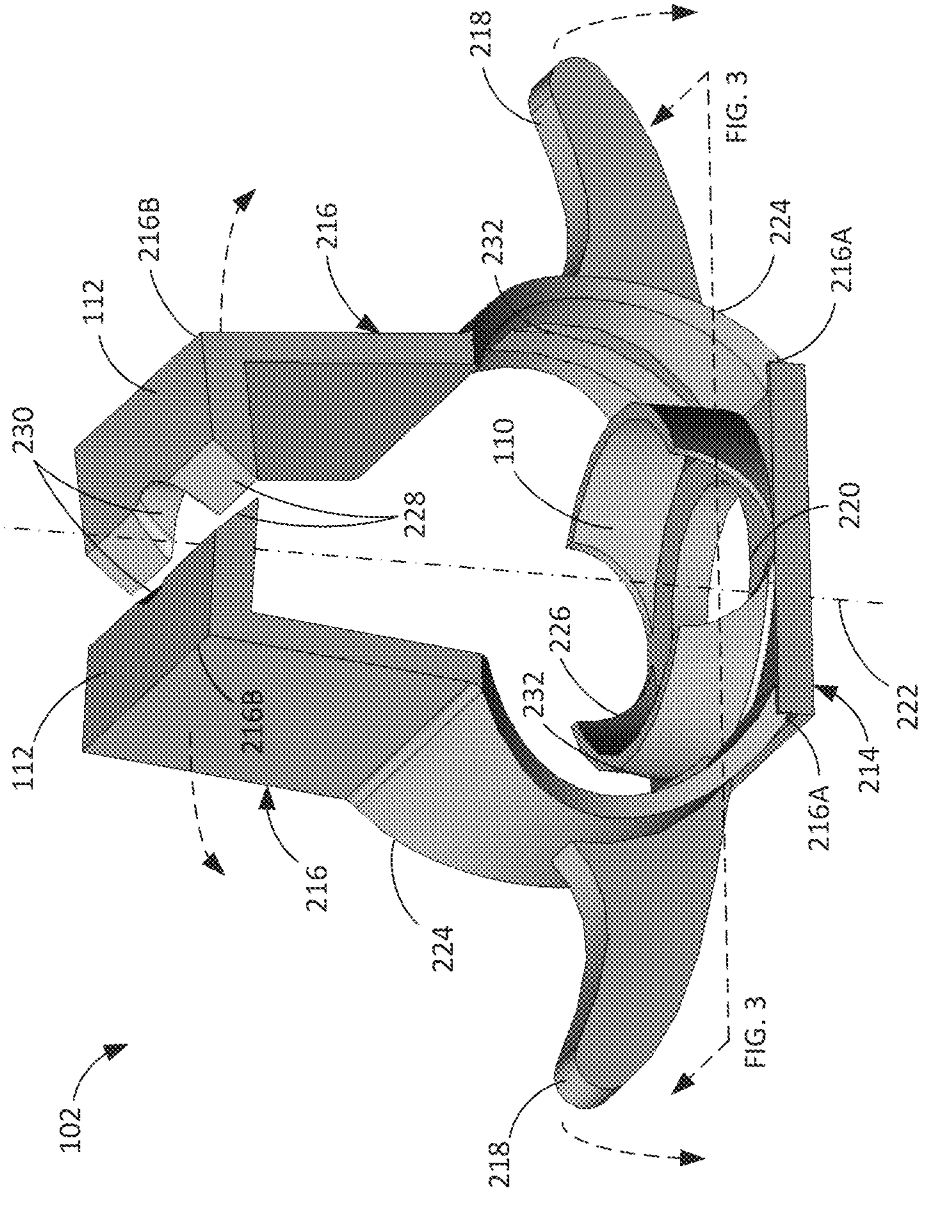
FIG. 2 depicts an isometric view of an apparatus for retaining a fastener, according to an example of the present disclosure.

FIG. 2 depicts an isometric view of the tool 102 for retaining a fastener, such as a wrenching element of a fastener, according to an example of the present disclosure. In the depicted embodiment, the tool 102 comprises a base 214, a plurality of arms 216, and a plurality of finger flanges 218.

The base 214 comprises a first aperture 220 having a central axis 222. A first end 216A of the arms 216 attaches to the base 214 and the arms 216 extend outward from the base 214. The arms 216 extend along the central axis 222. In some embodiments, the arms 216 may be offset by an angle from the central axis 222 when in an at-rest position, as shown in FIG. 2. For example, the arms 216 may be positioned at an angle of plus or minus 10 degrees from the central axis 222. The finger flanges 218 attach to the arms 216 and are configured to actuate the arms 216. For example, the finger flanges 218 may be configured to move the arms 216 in a direction away from the central axis 222 when the finger flanges 218 are actuated (e.g., moved towards the base 214). In some embodiments, the finger flanges 218 may be actuated by a user of the tool 102. In some embodiments, the user may use his or her fingers to pull the finger flanges 218 towards the base 214.

In this embodiment, arms 216 include biasing mechanisms 224 connecting the first ends 216A of the arms 216 to the base 214. The biasing mechanisms 224 are configured to relieve stress between the base 214 and the arms 216 when the arms 216 are actuated. For example, the biasing mechanisms 224 provide a flexible interface between the arms 216 and the base 214. In some embodiments, the biasing mechanisms 224 may be a spring. For example, the spring may be a compliant mechanism or an elastic element. In the depicted embodiment, the biasing mechanisms 224 have a curved shape that beneficially reduce a stress concentration factor, and thus reduces the maximum stress experienced by the tool 102, when the arm 216 is actuated, which leads to lower material fatigue and longer tool life. In this case, the curved shape of the biasing mechanisms 224 may be configured to increase an amount of cycles the arms 216 may be actuated during a lifetime of the tool 102. The curved shape of the biasing mechanisms 224 further functions as a spring to return the arms 216 to the at-rest position when the finger flanges 218 are no longer actuated. In some embodiments, the specific shape of the biasing mechanisms 224 may be different. For example, the biasing mechanisms 224 may have a different curvature or may be flat. In some embodiments, the biasing mechanisms 224 are continuous with a flat shape of the arms 216. For example, the arms 216 may have a flat shape extending from the base 214 to the lip 112. The biasing mechanisms 224 are a portion of the arms 216 that are configured to flex at or near the base 214 and provide the biasing function.

The base 214 further comprises the sidewall 110, which extends outward from the base 214 and surrounds the central axis 222 at some defined radius. In this embodiment, the sidewall 110 further includes stress relief notches 226. The stress relief notches 226 may comprise a curved shape that beneficially reduces the maximum stress experienced by the tool 102 when the arm 216 is actuated. The stress relief notches 226 may further be configured to increase an amount of actuation cycles the arms 216 are expected to endure during a lifetime of the tool 102.

The arms 216 comprises lips 112 at a second end 216B of the arms 216, which is at an opposite end of the arms 216 than the first end 216A. As previously discussed in relation to FIG. 1, the sidewall 110 is configured to hold on to a socket (e.g., the socket 106). The lip 112 is configured to retain the fastener or a wrenching element of the fastener inside the socket, such as a wrenching element of a breakaway fastener as discussed in relation to FIG. 1. The fastener may be partially installed prior to using the tool 102. For example, the collar of the breakaway fastener may be hand or finger tightened to a screw thread and the tool 102 may be used to finish installation of the fastener to a predetermined torque and retain the wrenching element after breakaway.

In some embodiments, lips 112 of the tool 102 comprises a draft angle or a taper (e.g., 228) and/or a second aperture 230. The second aperture 230 may be disposed on a side of the lip 112 nearest the central axis 222. The draft angle 228 and second aperture 230 of the lip 112 each may be configured to allow the lip 112 to be pushed over the fastener (e.g., a breakaway fastener) or wrenching element of the fastener, such as a wrenching element of a breakaway fastener, without needing to articulate the arms 216 using the finger flanges 218. For example, the draft angle 228 may be configured to allow the tool 102 to slide over the fastener by assisting the lip 112 of the arm 216 to be pushed over the fastener. The second aperture 230 may have a rounded shape configured to allow the lip 112 to be pushed over the fastener, such as the wrenching element of a breakaway fastener. Thus, the second aperture 230 allows the arm 216 of the tool 102 to move a lesser distance away from the central axis 222 when the tool 102 is pushed over a fastener, which may beneficially extend a fatigue life of and increases a number of times the tool 102 may be used.

The second aperture 230 may further grasp or hold on to the fastener after the lip 112 is pushed over the wrenching element of the fastener. For example, the second aperture 230 may allow the lip 112 to grasp the collar of the breakaway fastener once the wrenching element of the fastener is inside the socket, which beneficially may align the tool 102 to the fastener (e.g., the breakaway fastener) during installation. The lip 112 may grasp the collar at a location where the collar meets the wrenching element or at another location on a body of the collar. The finger flanges 218 may also be used to actuate the arms 216 of the tool 102 so that the lips 112 may be more easily pushed over the wrenching element of the collar.

As previously discussed in relation to FIG. 1, the wrenching element may break away when a predetermined torque is applied by another tool, such as a ratcheting socket set (shown in FIG. 1). The tool 102 is configured to retain the wrenching element inside the socket until a user is ready to safely dispose the wrenching element. The finger flanges 218 may be further configured to actuate the arms 216 to release the wrenching element from the socket by actuating the arms 112 as previously described. In some embodiments, the release of the wrenching element from the socket is directed into a foreign object debris (FOD) container or other target.

As previously discussed in relation to FIG. 1, the tool 102 may be mounted between a ratchet (e.g., the ratchet 104 in FIG. 1) and the socket. The first aperture 220 of the tool 102 may be configured to allow a drive (e.g. a socket connection interface) of the ratchet to penetrate the base 214 of the tool 102 and engage the socket.

In some embodiments, the apertures 220 and 230 allow additional tools, such as a hex key (e.g., an Allen key), to be inserted through the ratchet and the socket. For example, the hex key may be used to engage the screw thread and prevent the screw thread from rotating as the breakaway fastener is installed.

In some embodiments, the arms 216 further comprise a stiffener 232 attached to the biasing mechanism 224. The stiffener 232 may assist the biasing mechanism 224 by beneficially providing structural support to the arms 216.

In some embodiments, the finger flanges 218 actuate the biasing mechanisms 224 instead of the arms 216, and the biasing mechanisms 224 in turn actuate the arms 216. In some embodiments, each finger flange 218 comprises a flange cover (not shown). The flange covers may be configured to provide a grip to assist a user move the finger flanges 218 when actuating the arms 216. The flange covers may be made of a grip material, such as a rubber, foam, or cork. In some embodiments, the flange covers may further be used to identify the tool 102. For example, different color flange covers may be used for tools 102 configured to be used with different socket sizes. Different flange colors may also be used to identify what material the tool 102 is made of or whether the tool 102 is meant to be disposed of after use.

Generally, tool 102 may be made of a wide range of suitable, resilient, shape-keeping materials. In some embodiments, the tool 102 may be made of thermoplastics, such as nylon, polyethylene terephthalate glycol (PETG), or polylactic acid (PLA), which beneficially offer rigidity and flexibility. For example, the tool may be printed using a three-dimensional (3D) printer or formed using injection molding processes and the like. In some embodiments, fiber infused plastics may be used by a 3D printer to print the tool 102. Manufacturing the tool from a thermoplastic beneficially reduces the cost to manufacture the tool 102, and further allows the tool 102 to be a consumable item. Printing the tool 102 with a 3D printer beneficially allows the tool 102 to be manufactured on demand and customized before manufacture to fit any size of related tool, such as any size of socket and/or ratchet of a ratcheting socket set. For example, a dimension of the tool 102, such as a length of the arm 216, may be changed to accommodate sockets of different sizes. Thus, in some embodiments, the tool 102 may comprise different dimensions such that the tool may fit sockets and fasteners of different sizes.

In some embodiments, the tool 102 may be made of a metal, such as aluminum. For example, the tool 102 may be made out of a metal strip formed into shape, which beneficially allows the arms 216 of the tool 102 to have spring-like properties. In some embodiments, the tool 102 or portions of the tool may further be made of a magnetic material, which beneficially allows the tool to be picked up using a magnet and to further retain magnetic portions of fasteners, such as wrenching elements. For example, if the tool 102 becomes detached from the ratchet during use and falls in an area with limited space, a rod with a magnet may be used to pick up the tool 102.

In embodiments previously discussed, the tool 102 comprises several features that apply to each arm of the plurality of arms 216. In some embodiments, the tool 102 comprises one arm 216 and one finger flange 218. The arm 216 may further comprise other features previously described in relation to arms 216 such as the biasing mechanism 224, the lip 112, and the stiffener 232. The embodiment with one arm

216 may beneficially reduce the material required to manufacture the tool 102 and reduce the amount of moving parts of the tool 102.

Figure 3:
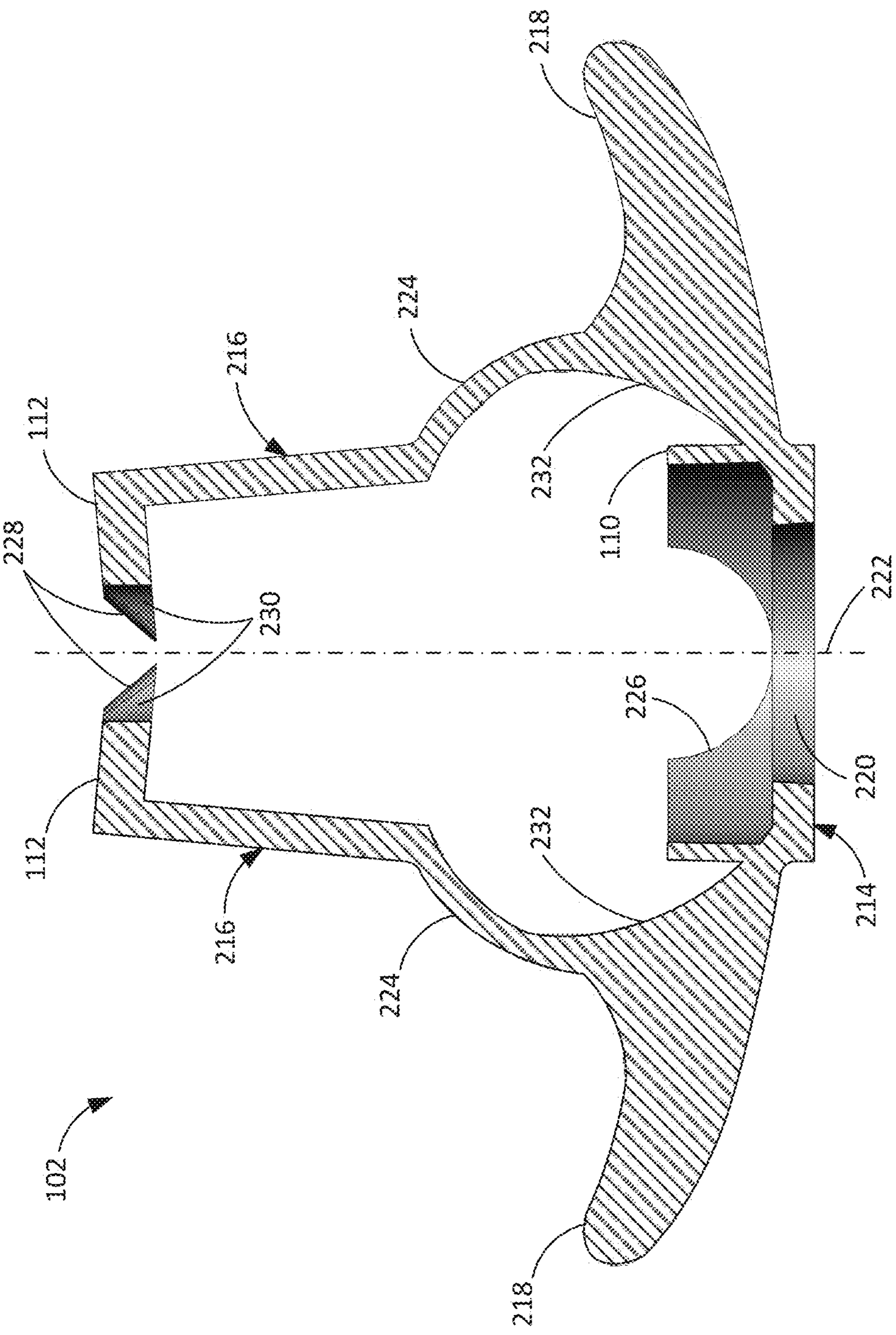
FIG. 3 depicts a cross-sectional view of an apparatus for retaining a fastener, according to the example embodiment from FIG. 2 of the present disclosure.

FIG. 3 depicts a cross-sectional view of the tool 102 for retaining a fastener, according to the example embodiment from FIG. 2 of the present disclosure. In particular, FIG. 3 shows the elements of the tool 102 from a cross-sectional perspective.

In the depicted embodiment, tool 102 includes a generally solid material cross-section; however, in other embodiments, portions of the cross-sectional area may include porous or otherwise non-solid infill patterns, which may save material and weight without sacrificing significant strength, or may control an amount of flexibility (e.g., biasing) of the tool 102.

Example Method for Retaining a Fastener

Figure 4:
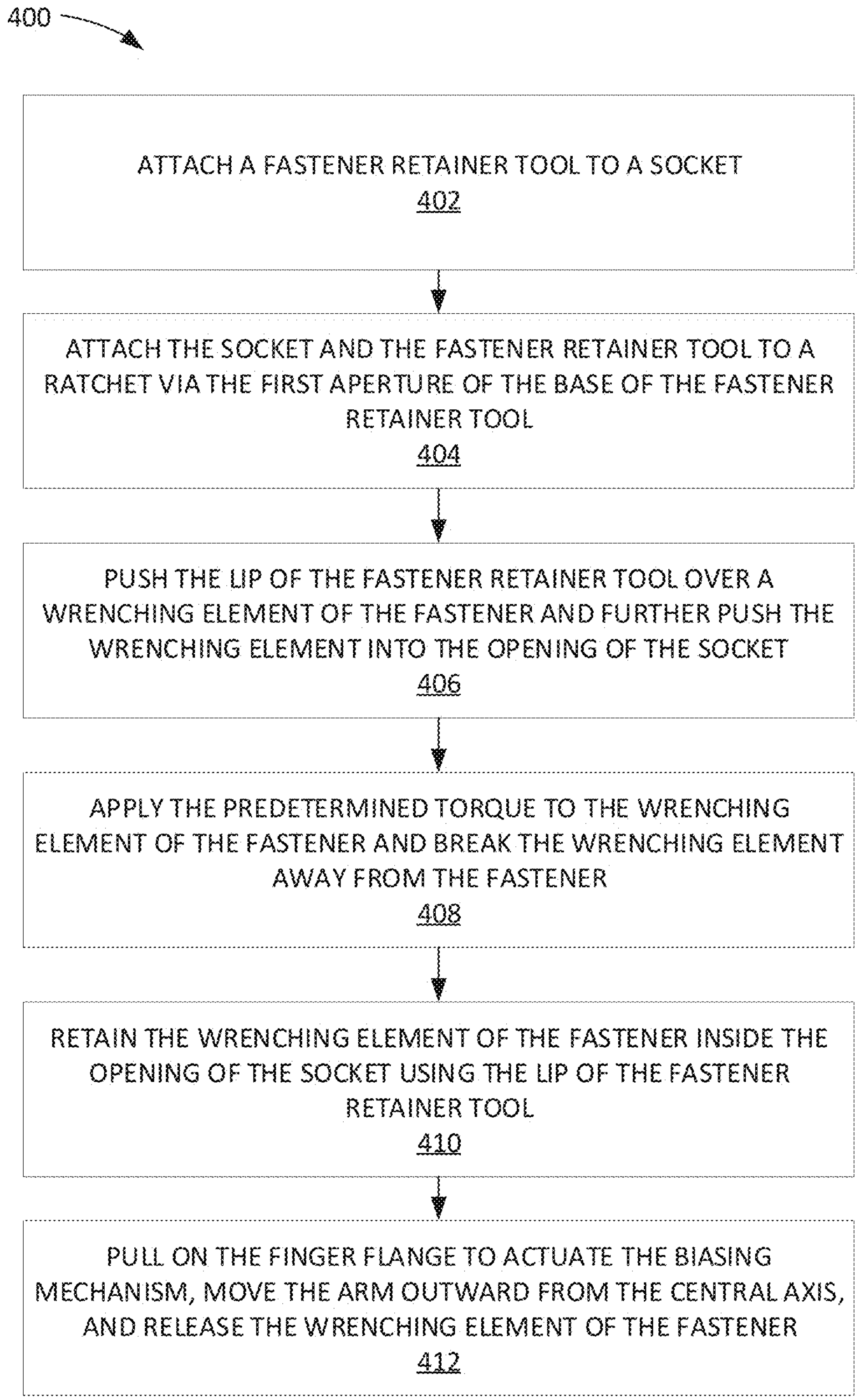
FIG. 4 depicts an example method for retaining a fastener, according to the systems and methods described herein.

FIG. 4 depicts an example method 400 for retaining a fastener, according to the systems and methods described herein.

Method 400 begins at step 402 with attaching a fastener retainer tool to a socket.

In some embodiments, the fastener retainer tool comprises a base, an arm extending outward from the base, and finger flange configured to actuate the arm, wherein the finger flange is attached to the arm, as described above with respect to FIGS. 2-3. In some embodiments, the base comprises a first aperture comprising a central axis and a sidewall extending outward from the base and surrounding the central axis, wherein the sidewall is configured to hold on to a socket. In some embodiments, the arm comprises a biasing mechanism connecting a first end of the arm to the base, wherein the biasing mechanism is configured to relieve stress between the base and the arm when the arm is actuated. In some embodiments, the arm further comprises a lip disposed at a second end of the arm, wherein the second end is at an opposite end of the arm than the first end, and wherein the lip is configured to retain the fastener or a wrenching element of the fastener. In some embodiments, the socket comprises an opening configured to engage the fastener and the socket is held between the base and the lip of the fastener retainer tool, as described above with respect to FIGS. 1-3.

Method 400 then proceeds to step 404 with attaching the socket and the fastener retainer tool to a ratchet via the first aperture of the base of the fastener retainer tool, as described above with respect to FIGS. 1-3.

Method 400 then proceeds to step 406 with pushing the lip of the fastener retainer tool over a wrenching element of the fastener and further pushing the wrenching element into the opening of the socket, as described above with respect to FIGS. 1-3.

Method 400 then proceeds to step 408 with applying the predetermined torque to the wrenching element of the fastener and breaking the wrenching element away from the fastener, as described above with respect to FIGS. 1-3. In some embodiments, the wrenching element of the fastener is configured to break away from the fastener at a predetermined torque.

Method 400 then proceeds to step 410 with retaining the wrenching element of the fastener inside the opening of the socket using the lip of the fastener retainer tool, as described above with respect to FIGS. 1-3.

Method 400 then proceeds to step 412 with moving the finger flange to actuate the arm, move the arm outward from the central axis, and release the wrenching element of the fastener from inside the opening of the socket, as described above with respect to FIGS. 2-3.

In some embodiments, the lip of the arm further comprises a draft angle configured to allow the fastener retainer tool to slide over the fastener, as described above with respect to FIGS. 2-3.

Some embodiments further include finger tightening the fastener onto a screw thread, as described above with respect to FIG. 2.

Some embodiments further include threading the fastener onto a screw thread, wherein the wrenching element of the fastener is configured to break away from the fastener at a predetermined torque, as described above with respect to FIGS. 1-3.

Some embodiments further include releasing the wrenching element of the fastener into a foreign object debris container or another target.

Note that FIG. 4 is just one example of a method, and other methods including fewer, additional, or alternative steps are possible consistent with this disclosure. For example, the discussion in relation to FIG. 4 describes an example with a ratcheting socket wrench and socket, such as shown in FIG. 1, but the fastener retainer tool could be used in other implementations, such as with different sockets, socket wrenches, or different fasteners.

Example Clauses

Implementation examples are described in the following numbered clauses:

Clause 1. An apparatus for retaining a fastener, comprising a base, comprising a first aperture comprising a central axis; and a sidewall extending outward from the base and surrounding the central axis, wherein the sidewall is configured to hold on to a socket; an arm extending outward from the base, comprising a biasing mechanism connecting a first end of the arm to the base, wherein the biasing mechanism is configured to relieve stress between the base and the arm when the arm is actuated; and a lip disposed at a second end of the arm, wherein the second end is at an opposite end of the arm than the first end, and wherein the lip is configured to retain the fastener or a wrenching element of the fastener; and a finger flange configured to actuate the arm, wherein the finger flange is attached to the arm.

Clause 2. The apparatus of Clause 1, wherein the sidewall comprises a stress relief notch.

Clause 3. The apparatus of Clauses 1-2, wherein the lip further comprises a draft angle configured to allow the fastener retainer tool to slide over the fastener.

Clause 4. The apparatus of Clause 3, wherein the lip further comprises a second aperture.

Clause 5. The apparatus of Clauses 1-4, wherein the arm further comprises a wedge attached to the lip.

Clause 6. The apparatus of Clauses 1-5, wherein the finger flange comprises a flange cover.

Clause 7. The apparatus of Clauses 1-6, wherein the finger flange is attached to the biasing mechanism.

Clause 8. The apparatus of Clauses 1-7, wherein the biasing mechanism is a spring.

Clause 9. The apparatus of Clause 8, wherein the arm further comprises a stiffener attached to the biasing mechanism.

Clause 10. An apparatus for retaining a fastener, comprising a base, comprising a first aperture comprising a central axis; and a sidewall extending outward from the base and surrounding the central axis, wherein the sidewall is configured to hold on to a socket; a plurality of arms extending outward from the base, wherein each arm of the plurality of arms comprises a biasing mechanism connecting a first end of each arm of the plurality of arms to the base, wherein the biasing mechanism is configured to relieve stress between the base and each arm of the plurality of arms when the arm is actuated; and a lip disposed at a second end of each arm of the plurality of arms, wherein the second end is at an opposite end of the arm than the first end, and wherein the lip is configured to retain the fastener or a wrenching element of the fastener; and a plurality of finger flanges, wherein each finger flange of the plurality of finger flanges is attached to each arm of the plurality of arms and configured to actuate each arm.

Clause 11. The apparatus of Clause 10, wherein the sidewall comprises a stress relief notch.

Clause 12. The apparatus of Clauses 10-12, wherein the lip of each arm of the plurality of arms further comprises a draft angle configured to allow the fastener retainer tool to slide over the fastener.

Clause 13. The apparatus of Clause 12, wherein the lip of each arm of the plurality of arms further comprises a second aperture.

Clause 14. The apparatus of Clauses 10-13, wherein each arm of the plurality of arms further comprises a wedge attached to the lip.

Clause 15. The apparatus of Clauses 10-14, wherein each finger flange of the plurality of finger flanges comprises a flange cover.

Clause 16. The apparatus of Clauses 10-15, wherein each finger flange of the plurality of finger flanges is attached to the biasing mechanism of each arm of the plurality of arms.

Clause 17. The apparatus of Clauses 10-16, wherein the biasing mechanism is a spring.

Clause 18. The apparatus of Clause 17, wherein the biasing mechanism further comprises a stiffener attached to the biasing mechanism.

Clause 19. A method for retaining a fastener, comprising attaching a fastener retainer tool to a socket, wherein the fastener retainer tool comprises a base, comprising a first aperture comprising a central axis, and a sidewall extending outward from the base and surrounding the central axis, wherein the sidewall is configured to hold on to a socket, an arm extending outward from the base, comprising a biasing mechanism connecting a first end of the arm to the base, wherein the biasing mechanism is configured to relieve stress between the base and the arm when the arm is actuated, and a lip disposed at a second end of the arm, wherein the second end is at an opposite end of the arm than the first end, and wherein the lip is configured to retain the fastener or a wrenching element of the fastener, and a finger flange configured to actuate the arm, wherein the finger flange is attached to the arm; the socket comprises an opening configured to engage the fastener; and the socket is held between the base and the lip of the fastener retainer tool; attaching the socket and the fastener retainer tool to a ratchet via the first aperture of the base of the fastener retainer tool; and pushing the lip of the fastener retainer tool over a wrenching element of the fastener and further pushing the wrenching element into the opening of the socket, wherein the wrenching element of the fastener is configured to break away from the fastener at a predetermined torque, applying the predetermined torque to the wrenching element of the fastener and breaking the wrenching element away from the fastener, retaining the wrenching element of the fastener inside the opening of the socket using the lip of the fastener retainer tool, and pulling on the finger flange to actuate the biasing mechanism, move the arm outward from the central axis, and release the wrenching element of the fastener.

Clause 20. The method of Clause 19, wherein the lip of the arm further comprises a draft angle configured to allow the fastener retainer tool to slide over the fastener.

Clause 21. The method of Clauses 19-20, further comprising finger tightening the fastener onto a screw thread.

Clause 22. The method of Clauses 19-21, further comprising threading the fastener onto a screw thread.

Clause 23. A method of using an apparatus for retaining a fastener, comprising using an apparatus to retain a wrenching element of the fastener, wherein the apparatus comprises a base, comprising a first aperture comprising a central axis; and a sidewall extending outward from the base and surrounding the central axis, wherein the sidewall is configured to hold on to a socket; an arm extending outward from the base, comprising a biasing mechanism connecting a first end of the arm to the base, wherein the biasing mechanism is configured to relieve stress between the base and the arm when the arm is actuated; and a lip disposed at a second end of the arm, wherein the second end is at an opposite end of the arm than the first end, and wherein the lip is configured to retain the fastener or a wrenching element of the fastener; and a finger flange configured to actuate the arm, wherein the finger flange is attached to the arm.

Clause 24. The method of Clause 23, wherein the sidewall comprises a stress relief notch.

Clause 25. The method of Clause 23, wherein the lip further comprises a draft angle configured to allow the fastener retainer tool to slide over the fastener.

Clause 26. The method of Clause 25, wherein the lip further comprises a second aperture.

Clause 27. The method of Clause 26, wherein the arm further comprises a wedge attached to the lip.

Clause 28. The method of Clauses 23-27, wherein the finger flange comprises a flange cover.

Clause 29. The method of Clauses 23-28, wherein the finger flange is attached to the biasing mechanism.

Clause 30. The method of Clauses 23-29, wherein the biasing mechanism is a spring.

Clause 31. The method of Clause 30, wherein the arm further comprises a stiffener attached to the biasing mechanism.

Clause 32. The method of Clauses 23-31, further comprising releasing the wrenching element of the fastener into a foreign object debris container or another target.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for retaining a fastener, comprising:
- a base, comprising:
  - a first aperture comprising a central axis; and
  - a sidewall extending outward from the base and surrounding the central axis, wherein the sidewall is configured to hold on to a socket;
- an arm extending outward from the base, comprising:
  - a biasing mechanism connecting a first end of the arm to the base, wherein the biasing mechanism is configured to relieve stress between the base and the arm when the arm is actuated; and
  - a lip disposed at a second end of the arm, wherein the second end is at an opposite end of the arm than the first end, and wherein the lip is configured to retain the fastener or a wrenching element of the fastener; and
- a finger flange configured to actuate the arm, wherein the finger flange is attached to the arm.

2. The apparatus of claim 1, wherein the sidewall comprises a stress relief notch.

3. The apparatus of claim 1, wherein the lip further comprises a draft angle configured to allow the apparatus to slide over the fastener.

4. The apparatus of claim 3, wherein the lip further comprises a second aperture.

5. The apparatus of claim 1, wherein the arm further comprises a wedge attached to the lip.

6. The apparatus of claim 1, wherein the finger flange comprises a flange cover.

7. The apparatus of claim 1, wherein the finger flange is attached to the biasing mechanism.

8. The apparatus of claim 1, wherein the biasing mechanism is a spring.

9. The apparatus of claim 8, wherein the arm further comprises a stiffener attached to the biasing mechanism.

10. An apparatus for retaining a fastener, comprising:
a base, comprising:
a first aperture comprising a central axis; and
a sidewall extending outward from the base and surrounding the central axis, wherein the sidewall is configured to hold on to a socket;
a plurality of arms extending outward from the base, wherein each arm of the plurality of arms comprises:
a biasing mechanism connecting a first end of each arm of the plurality of arms to the base, wherein the biasing mechanism is configured to relieve stress between the base and each arm of the plurality of arms when the arm is actuated; and
a lip disposed at a second end of each arm of the plurality of arms, wherein the second end is at an opposite end of the arm than the first end, and wherein the lip is configured to retain the fastener or a wrenching element of the fastener; and
a plurality of finger flanges, wherein each finger flange of the plurality of finger flanges is attached to each arm of the plurality of arms and configured to actuate each arm.

11. The apparatus of claim 10, wherein the sidewall comprises a stress relief notch.

12. The apparatus of claim 10, wherein the lip of each arm of the plurality of arms further comprises a draft angle configured to allow the apparatus to slide over the fastener, and wherein the lip of each arm of the plurality of arms further comprises a second aperture.

13. The apparatus of claim 10, wherein arm of the plurality of arms further comprises a wedge attached to the lip.

14. The apparatus of claim 10, wherein each finger flange of the plurality of finger flanges comprises a flange cover.

15. The apparatus of claim 10, wherein each finger flange of the plurality of finger flanges is attached to the biasing mechanism of each arm of the plurality of arms.

16. The apparatus of claim 10, wherein the biasing mechanism is a spring, and wherein the biasing mechanism further comprises a stiffener attached to the biasing mechanism.

17. A method for retaining a fastener, comprising:
attaching a fastener retainer tool to a socket, wherein:
the fastener retainer tool comprises:
a base, comprising:
a first aperture comprising a central axis, and
a sidewall extending outward from the base and surrounding the central axis, wherein the sidewall is configured to hold on to a socket,
an arm extending outward from the base, comprising:
a biasing mechanism connecting a first end of the arm to the base, wherein the biasing mechanism is configured to relieve stress between the base and the arm when the arm is actuated, and
a lip disposed at a second end of the arm, wherein the second end is at an opposite end of the arm than the first end, and wherein the lip is configured to retain and the fastener or a wrenching element of the fastener, and
a finger flange configured to actuate the arm, wherein the finger flange is attached to the arm;
the socket comprises an opening configured to engage the fastener; and
the socket is held between the base and the lip of the fastener retainer tool;
attaching the socket and the fastener retainer tool to a ratchet via the first aperture of the base of the fastener retainer tool;
pushing the lip of the fastener retainer tool over a wrenching element of the fastener and further pushing the wrenching element into the opening of the socket, wherein the wrenching element of the fastener is configured to break away from the fastener at a predetermined torque;
applying the predetermined torque to the wrenching element of the fastener and breaking the wrenching element away from the fastener;
retaining the wrenching element of the fastener inside the opening of the socket using the lip of the fastener retainer tool; and
pulling on the finger flange to actuate the biasing mechanism, move the arm outward from the central axis, and release the wrenching element of the fastener.

18. The method of claim 17, wherein the lip of the arm further comprises a draft angle configured to allow the fastener retainer tool to slide over the fastener.

19. The method of claim 17, further comprising finger tightening the fastener onto a screw thread.

20. The method of claim 17, further comprising threading the fastener onto a screw thread.

* * * * *